(No Model.)  2 Sheets—Sheet 1.

J. G. RAWLS.
Spiral Cotton Chopper.

No. 233,546.  Patented Oct. 19, 1880.

Attest:
F. H. Schott
C. M. Connell

Inventor:
Joseph G. Rawls
Per Jas. M. Blanchard
Attorney.

(No Model.)  2 Sheets—Sheet 2.
J. G. RAWLS.
Spiral Cotton Chopper.
No. 233,546. Patented Oct. 19, 1880.
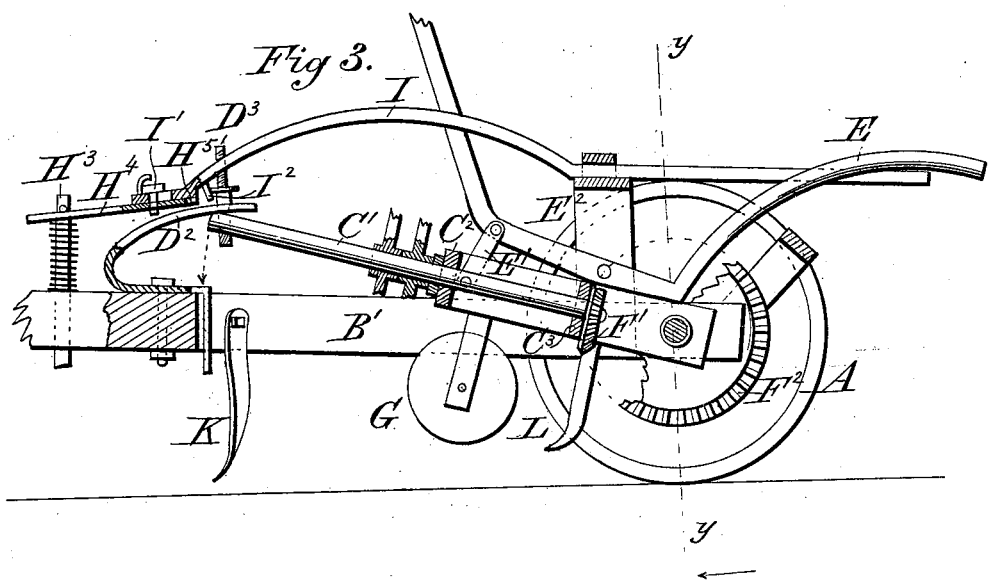
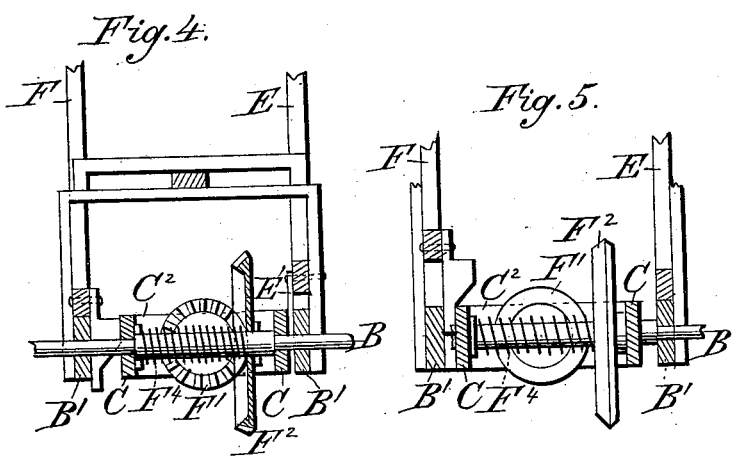
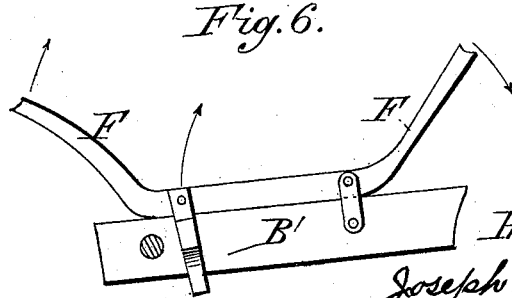
Attest:
F. H. Schott.
C. M. Connell
Inventor:
Joseph G. Rawls
Per. Jas. M. Blanchard
Attorney.

UNITED STATES PATENT OFFICE.

JOSEPH G. RAWLS, OF WILSON, NORTH CAROLINA.

SPIRAL COTTON-CHOPPER.

SPECIFICATION forming part of Letters Patent No. 233,546, dated October 19, 1880.

Application filed July 17, 1880. (No model.)

*To all whom it may concern:*

Be it known that I, JOSEPH G. RAWLS, a citizen of the United States, residing at Wilson, in the county of Wilson and State of North Carolina, have invented certain new and useful Improvements in Spiral Cotton Choppers or Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in spiral cotton choppers or cultivators; and the objects of my improvements are, first, to provide a chopper having a series of spirally-arranged rotating hoes or cutters for cutting or chopping out the spaces between the plants which it is desirable to leave standing; second, to provide a tilting and laterally-adjustable frame for the shaft which carries the hoes or cutters; third, to provide means for regulating the depth which the hoes or cutters shall be allowed to enter the earth, and for elevating said hoes or cutters for allowing them to pass over obstructions; fourth, to provide adjustable scrapers for barring off the rows and for placing the requisite amount of earth by the sides of the plants for their support after the chopping and barring have been done; fifth, to provide the requisite means for guiding the machine and for allowing it to be turned around within the shortest possible space; sixth, to provide the requisite construction and arrangement of parts for producing the results sought to be accomplished. I attain these objects by the mechanism illustrated in the accompanying drawings, in which—

Figure 1:
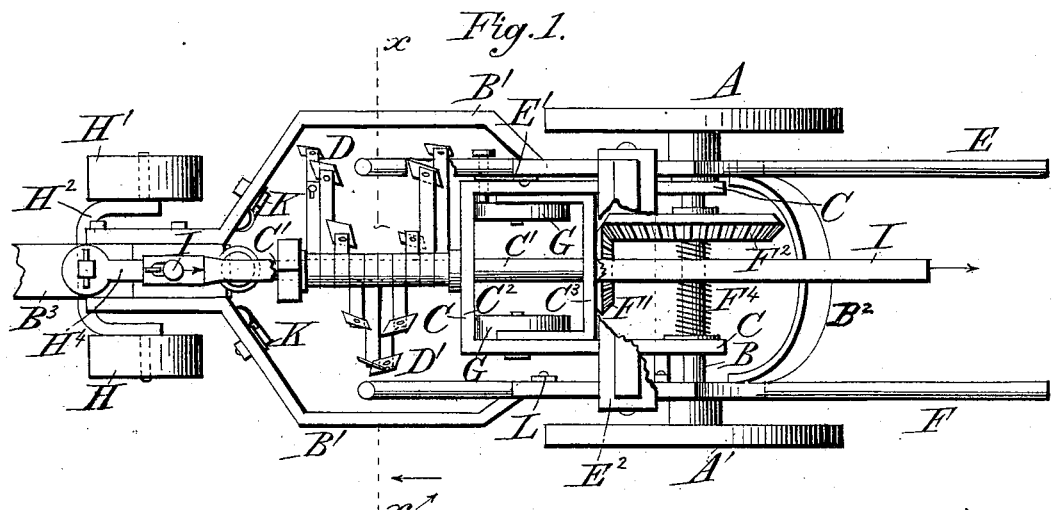
Figure 2:
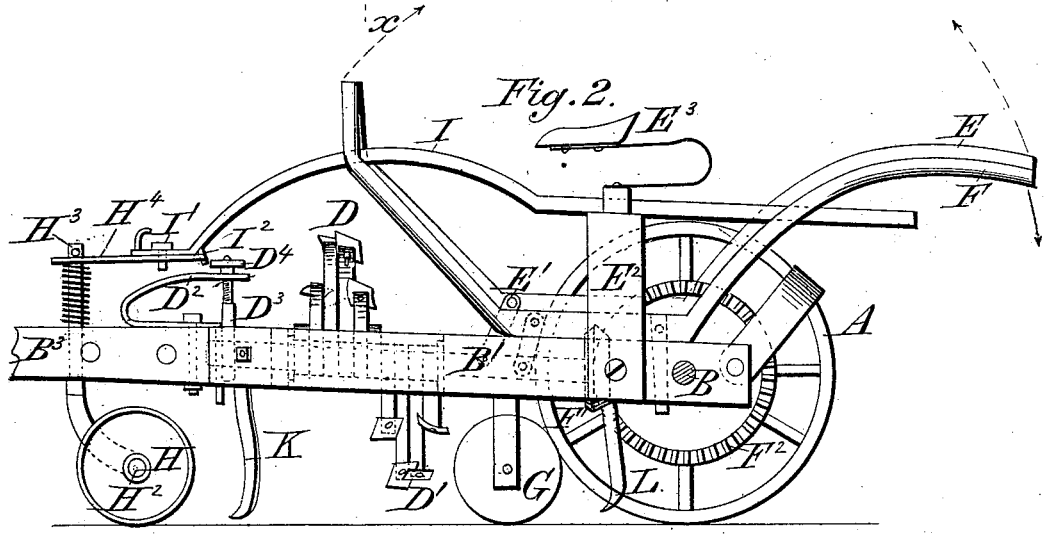
Figure 7:
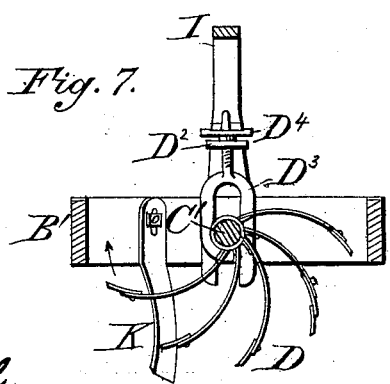

Figure 1 is a plan view, showing the frames, the carrying or driving wheels and their axle, the driving-gearing, the spirally-arranged rotating hoes or cutters, the guiding-wheels, and the mechanism for guiding the machine and for locking said mechanism in its adjusted position. Fig. 2 is a side elevation, showing the outer or main frame, the driving-gearing, the relative positions of two groups of spirally-arranged rotating hoes or cutters, the device for controlling the positions of the forward end of the shaft which carries the rotating hoes or cutters, and the mechanism for guiding the machine. Fig. 3 is a longitudinal elevation, partly in section, showing the shaft which carries the rotating hoes or cutters with its front end elevated and the guiding mechanism. Figs. 4 and 5 are sections on line $y\ y$ of Fig. 3, the former showing the parts in the positions they assume when driving-gearing is in mesh and the wedge-shaped block for forcing it into gear, and the latter showing them in the positions they assume when the gearing is not in mesh. Fig. 6 is a detached view, showing a portion of the main frame with one of the operating-levers attached to it, and carrying wedge for adjusting the inside frame laterally, so as to force the driving-gearing into mesh and allow it to be thrown out; and Fig. 7 is a sectional elevation on line $x\ x$ of Fig. 1, showing the mechanism for controlling the position of the forward end of the shaft which carries the rotating hoes or cutters, a portion of which are also shown.

Similar letters refer to similar parts in all of the figures.

In constructing choppers or cultivators of this type there are provided two carrying-wheels, A A', which may be of any desired diameter and form of construction, they being carried upon a shaft, B, which is journaled in the main frame B', and near its rear end, at which points suitable boxes are provided for its reception.

The frame B', just alluded to, consists of two bars of metal or any other suitable material, of substantially the form shown in Figs. 1 and 2 of the drawings, their rear ends being held in position with reference to each other by means of a bar, B², while their forward ends are bolted to the tongue B³, the space between them near this point being sufficiently wide to allow the rotating hoes or cutters to revolve between them.

Between the rear portions of frame B' there is placed a tilting and laterally-adjustable frame, C, which is of less width than the space between the parts of frame B', in order that it may be moved laterally on the shaft B when it is desirable to throw the driving-gearing into or out of mesh. This frame is made to swing partially around axle B, it being secured thereto by boxes of any approved form; or said axle may be made to pass through the sides of the frame.

For the purpose of supporting the shaft C', which carries the revolving hoes or cutters and the smallest of the gear-wheels, bars C² and C³ extend from side to side of frame C, and have formed in them apertures for the passage of the shaft C', they forming bearings therefor at its rear end, while its forward end rests in a groove formed in the rear end of the tongue B³ of the machine, or in a plate of metal secured thereto or to the frame B'.

Between the forward end of the frame C and the forward end of the shaft C' there are placed two series of spirally-arranged hoes or cutters, which are designated by the letters D D'. These cutters are attached to arms by means of a bolt and nut, as shown in Figs. 2 and 7, so that they may be adjusted on said arms in such a manner as to carry their outer surfaces to a greater or less distance from the center of the axle upon which they are placed, said adjusting arrangement forming an additional means of controlling the depth to which they shall enter the ground.

The above-described arrangement of the frame C and the driving-gears admits of the forward end of the shaft C' and the revolving hoes or cutters being raised to any desired height without affecting the mesh of the gears, as that remains the same at whatever point the forward end of the shaft may be placed.

The inner ends of the arms, to which the hoes or cutters D D' are attached, are provided with hubs, through which the shaft C' passes, and by increasing or decreasing the lengths of these hubs the hoes can be placed at a greater or less distance apart, or they can be lengthened upon their cutting faces, and so a less number be used.

The arrangement of these hoes or cutters forms an important feature of my invention, it being such as to cause them to assume a spiral form, and at the same time to leave a space between the points from which the earth or the plants are removed, so that as the machine is drawn forward the hoes or cutters will cut out of the row of growing plants a space of, say, ten or twelve inches, and will then leave a space of three or four inches, in which the plants will be left standing. These spaces, however, may be increased or diminished by varying the diameters of the carrying or driving wheels, or by varying the relative diameters of the gear-wheels, or by the space left between the series of hoes or cutters.

For the purpose of making provision for raising the forward end of the shaft which carries the rotating hoes, and thus determining the depth that they may enter the ground while cultivating any particular field, there is placed in any suitable standard or bracket, D², attached to the forward end of the frame B' or to the tongue B³, a hanger, D³, the lower portion of which is provided with a slot, in which the forward end of said shaft rests, while upon the upper end of said hanger there is formed a rod, upon which is placed a nut, which, by being turned up or down, will determine the lowest point to which the hoes can descend, and consequently the depth which they will enter the earth.

For the purpose of raising the hoes or cutters in passing from place to place, and when there are stumps, stones, or other obstructions in the path of the machine, there is pivoted to the forward end of frame C a lever, E, its connection with said frame being made by a link, E', said lever turning on a bolt or pin fixed in the bracket E², from which point the lever extends forward and is bent upward, as shown, in order that a person sitting in the driver's seat E³, which rests upon a spring attached to said bracket, can operate it in raising or lowering the hoes. The same lever extends rearward from its pivotal point sufficiently far to permit a person walking behind the machine to raise and lower the hoes by the manipulation of its rear end.

For moving the frame C transversely upon the axle B, there is pivoted to the frame B', upon the side opposite to the one above described, a lever, F, the form of which is substantially like that of E, it extending forward and rearward from the driver's seat, so that it can be operated from either end. Upon this lever, at some point in the rear of its pivotal point, there is secured a wedge or cam, as shown in Figs. 4, 5, and 6, which is so arranged that when the rear end of said lever F is pressed downward said wedge or cam will be carried into the position shown in Fig. 4, and the frame C, as there shown, will be carried into such a position as to bring the wheels F' and F² into mesh with each other, when, in consequence of the fact that the large wheel F² is firmly secured to the driving-shaft B, the wheel F', the shaft C, and the hoes or cutters D D' will be caused to rotate so long as the parts are left in these positions and the machine is moved forward; but it frequently becomes desirable to stop the rotation of the hoes or cutters—as, for instance, when the machine is being used as a seed-planter, as will be described hereinafter, or when it is being moved from place to place—at which times the rear end of lever F is to be raised, when the spring F⁴, which surrounds shaft B—its ends resting upon wheel F²—and the inside of one part of frame C will cause said frame to be moved transversely on said shaft to such an extent as to cause the wheel F' to be forced out of mesh with F², and the shaft C' and the parts connected therewith will remain at rest.

I have shown wheels G G attached to the frame C near its front end; but these may be dispensed with, as they are not regarded as important.

For the purpose of enabling the machine to be turned around upon a narrow headland or within a short space, there are provided two leading-wheels, H H', which are affixed to an axle, H², from the upper surface of which there extends a vertical shaft, H³, which passes up through an aperture in the tongue B³, under which, and upon the shaft H³, there may be placed a nut, so that by turning it up against said tongue the front part of the machine may be raised farther from the ground or allowed to be carried nearer to it, there being placed around the upper portion of shaft H³ a spring to keep the tongue pressed down upon the nut or upon a shoulder formed on said shaft, upon the upper end of which there is secured an arm or lever, H⁴, which extends rearward therefrom for any desired distance, its rear end being provided with a slot, H⁵.

To the arm or lever H⁴ there is secured so as to slide longitudinally thereon a rod or bar, I, which extends rearward therefrom to or beyond the rear end of the machine, it resting and sliding in a guide attached to the upper surface of the bracket E². The front end of this rod or bar is provided with a slot, through which a bolt, I', passes, and is screwed into the arm H⁴, upon which the rod slides.

The arrangement of these last-named parts is such that when the machine is being moved forward the rod or bar I is pushed forward until a projection upon its under surface enters the slot H⁵ in the arm or lever H⁴, and thus locks the leading or caster wheels and the axle in position for use in cultivating the crop; but when, on arriving at the end, or at other times, it becomes necessary to turn the machine around, the rod or bar is moved to the rear far enough to withdraw the projection from the slot in arm H⁴, when the machine may be turned around by the team pressing against the tongue, owing to the fact that the leading or caster wheels are then free to assume any required angle with reference to the previous path of the machine.

For the purpose of barring off the rows in advance of the rotating hoes or cutters, there is placed upon the frame B', and upon each side thereof, one or more vertically-adjustable hoes or cutters, K, which are so placed upon the parts of the frame as to leave between them a space wide enough to permit the plants to pass between them, and yet to leave the bar so narrow that as the rotating hoes are brought into requisition the entire bar will be by them cut away between the plants to be left standing.

The forms of the lower portions of the hoes or cutters K may be changed to adapt them to the soil and the crop, they being such as to throw the earth away from the rows of plants.

The process of cultivating the crop having proceeded so far as to bar off the rows and to cut out such portions as it is not desirable to leave standing, it becomes necessary to provide for supporting the remaining plants by placing against them some portion of the earth which has been removed, and to do this there are provided two or more hoes or scrapers, L, one or more of which are secured to the opposite sides of the tilting frame C, and are so formed that as they pass along beside the plants which are left standing they will place the amount of earth required for the support thereof by their sides.

By placing upon the shaft C' of this machine, between the bars C² and C³, a feed-roller and attaching to the frame C a suitable hopper having openings provided with slides for allowing the requisite amount of seed to pass in any given period of time, the machine may be converted into a planter for cotton or other seeds, the covering of such seeds being effected by pivoting to the frame C, or to any other proper point of said machine, two bars, the outer or rear ends of which should have a free up-and-down movement and be provided with grooved or otherwise formed wheels for covering the seeds.

I am aware that rotating hoes or cutters in connection with cotton-choppers are not novel, and hence I do not claim them, broadly; but I am not aware that such hoes or cutters have ever been spirally arranged upon their shaft, as in my case, whereby they are made to form continuous cutters or a continuous cutting operation, as compared with intermittent cutters or an intermittent cutting operation; and, hence,

What I claim, and desire to secure by Letters Patent, is—

1. In a cotton chopper or cultivator, a rotating shaft placed at a right angle to the axle of the driving-wheels, and having upon it two or more series of spirally-arranged hoes or cutters, substantially as and for the purpose set forth.

2. In a cotton chopper or cultivator, the tilting and laterally-adjustable frame C, arranged within an outer frame, and adapted, by its lateral movement, to move the wheel F' into and out of mesh with wheel F², as described, and by its tilting movement to regulate the depth to which the hoes shall enter the earth in their rotation, substantially as set forth.

3. In a cotton chopper or cultivator, the combination of a tilting and laterally-adjustable shaft, one or more series of spirally-arranged hoes or cutters, and an adjustable bearing or yoke at the forward end of said shaft, for controlling the depth which said hoes or cutters shall enter the earth while in operation, the parts being arranged for operation substantially as set forth.

4. The combination of the scrapers or cutters K, carried upon the main frame of the machine, for barring off the ground, and the scrapers L, carried upon the tilting and laterally-adjustable frame C, for placing earth around the standing plants, as set forth.

5. The combination of the main frame of a cotton chopper or cultivator and a tilting and laterally-adjustable frame, C, the tilting and laterally-adjustable movements of which are independent of said main frame, as shown.

6. The combination, in a cotton chopper or cultivator, of driving or carrying wheels A, frame B', driving-shaft B, gear-wheels F' and F², and laterally-adjustable frame C, the parts being arranged for joint operation substantially as described.

7. The combination of lever F, carrying a wedge or cam shaped projection, the laterally-adjustable and tilting frame C, driving-wheel shaft B, and spiral spring F⁴, the parts being arranged substantially as described, for throwing the driving-gears into and out of mesh with each other.

8. In combination with guiding or caster wheels of a cotton chopper or cultivator and their axle, a vertical shaft, H³, horizontal notched arm H⁴, and a sliding rod or bar, I, extending to or beyond the rear end of the machine, and having a projection, I², for locking the guiding-wheels in position, the arrangement of parts being as described, whereby the operator can lock and unlock the said wheels while walking in the rear of the machine, as set forth.

In testimony whereof I affix my signature in presence of two witnesses.

JOSEPH G. RAWLS.

Witnesses:
W. W. MORTIMER,
C. M. CONNELL.